(12) United States Patent
Bortolon

(10) Patent No.: US 12,142,162 B2
(45) Date of Patent: *Nov. 12, 2024

(54) OPTIMISED DEVICE FOR SIMULATING DRIVING EXPERIENCES

(71) Applicant: CRESNO SA, Roveredo GR (CH)

(72) Inventor: Riccardo Bortolon, Roveredo GR (CH)

(73) Assignee: CRESNO SA, Roveredo (CH)

( * ) Notice: Subject to any disclaimer, the term of this patent is extended or adjusted under 35 U.S.C. 154(b) by 756 days.

This patent is subject to a terminal disclaimer.

(21) Appl. No.: 17/413,232

(22) PCT Filed: Dec. 10, 2019

(86) PCT No.: PCT/IB2019/060602
§ 371 (c)(1),
(2) Date: Jun. 11, 2021

(87) PCT Pub. No.: WO2020/121185
PCT Pub. Date: Jun. 18, 2020

(65) Prior Publication Data
US 2022/0076586 A1 Mar. 10, 2022

(30) Foreign Application Priority Data
Dec. 12, 2018 (IT) .......................... 202018000003923

(51) Int. Cl.
*G09B 9/05* (2006.01)
*B60W 40/09* (2012.01)
*B62D 15/02* (2006.01)

(52) U.S. Cl.
CPC .............. *G09B 9/05* (2013.01); *B60W 40/09* (2013.01); *B62D 15/021* (2013.01)

(58) Field of Classification Search
CPC ............. G09B 9/04; G09B 9/042; G09B 9/05
(Continued)

(56) References Cited

U.S. PATENT DOCUMENTS

| 4,303,236 A * | 12/1981 | Czarnecki ................ G09B 9/02 472/60 |
| 5,885,080 A * | 3/1999 | Letovsky ................ G09B 9/04 434/30 |

(Continued)

FOREIGN PATENT DOCUMENTS

| WO | 2008/081406 | 7/2008 |
| WO | 2012/160025 | 11/2012 |

(Continued)

OTHER PUBLICATIONS

International Search Report for PCT/IB2019/060602 dated Mar. 11, 2020, 3 pages.

(Continued)

*Primary Examiner* — Joseph B Baldori
(74) *Attorney, Agent, or Firm* — NIXON & VANDERHYE

(57) ABSTRACT

A driving experience simulation device includes at least five superimposed planes, the planes being in sequence from the bottom upwards: a first plane in turn including a first rotation plate; a second plane in turn including a second rotation plate; a third plane including a track-like structure for the sliding of an overlying sliding base; a fourth plane in turn including the sliding base, a fourth rotation plate integrally joined beneath the sliding base, a support supporting the fourth rotation plate and slidable in the structure; and a fifth plane including at least one cockpit the simulation device being characterised in that the track-like structure of the third plane is constrained to the underlying second rotation plate by way of a pin, the latter constraining the front smaller side of the rectangular profile of the track-like structure with the edge of the underlying rotation plate of the second plane.

20 Claims, 3 Drawing Sheets

(58) Field of Classification Search
USPC .............................. 434/62, 66, 67, 69, 70, 71
See application file for complete search history.

(56) References Cited

U.S. PATENT DOCUMENTS

| | | | | |
|---|---|---|---|---|
| 6,431,989 | B1* | 8/2002 | Katayama | A63G 31/16 |
| | | | | 472/60 |
| 7,033,177 | B2* | 4/2006 | Kim | G09B 9/12 |
| | | | | 434/30 |
| 8,356,996 | B2* | 1/2013 | Mayrhofer | G09B 9/12 |
| | | | | 434/55 |
| 9,789,411 | B2* | 10/2017 | Masutti | G09B 9/05 |
| 9,812,045 | B2* | 11/2017 | Choi | G03B 21/562 |
| 10,403,164 | B2* | 9/2019 | Tischer | A63G 31/16 |
| 10,650,695 | B2* | 5/2020 | Minen | G01M 17/007 |
| 11,295,628 | B2* | 4/2022 | Bortolon | G09B 9/02 |
| 2005/0042578 | A1* | 2/2005 | Ammon | G09B 9/04 |
| | | | | 434/62 |
| 2010/0216097 | A1* | 8/2010 | Romagnoli | G09B 9/02 |
| | | | | 434/62 |
| 2016/0379512 | A1* | 12/2016 | Kirkman | G09B 9/06 |
| | | | | 434/34 |
| 2020/0111381 | A1* | 4/2020 | Tang | G06F 30/20 |
| 2022/0254268 | A1* | 8/2022 | Warne | G09B 9/04 |
| 2023/0050558 | A1* | 2/2023 | Martinelli | G09B 9/04 |

FOREIGN PATENT DOCUMENTS

| | | |
|---|---|---|
| WO | 2014/076079 | 5/2014 |
| WO | 2018/078485 | 5/2018 |

OTHER PUBLICATIONS

Written Opinion of the ISA for PCT/IB2019/060602 dated Mar. 11, 2020, 5 pages.

* cited by examiner (a)

(b)

OPTIMISED DEVICE FOR SIMULATING DRIVING EXPERIENCES

BACKGROUND OF THE INVENTION

Field of the Invention

The present invention refers to the mechanical industry. More in detail, the present invention refers to the field of driving simulation systems and, particularly but not limitedly, it refers to an optimised device for simulating vehicle driving experiences offering more degrees of freedom of movement for some of the components included therein, with respect to a previous version thereof described previously.

Description of the Related Art

In recent decades, automated equipment suitable to allow the simulation of activities such as professional vehicle driving and piloting aircraft has been particularly successful and distributed. These systems, initially conceived for training in the aerospace industry and subsequently in the aeronautical industry, found immediate application in the entertainment and edutainment industry and over time they have been extensively innovated and improved to the point that they prove indispensable for the training of pilots who carry out the aforementioned activities at competitive and professional level.

In the case of flight simulators, these are systems that aim at simulating the experience of piloting an aircraft as closely as possible to reality. Thus, the various types of simulators vary from video games to real-scale reproductions of actual cockpit cabins, so-called "cockpit", in which the planes are mounted on electromechanical or hydraulic actuators entirely managed by computer. This type of simulators is widely used in the aeronautical and military industry for training pilots in the widest range of situations and in particular in emergencies or disasters. All this in order to consistently innovate aeronautical development and reduce the costs and risks arising from training.

In the automotive industry, in recent years sophisticated simulation systems have been developed to such an extent that they are used by renowned car manufacturers for the training Formula 1, NASCAR, IndyCar drivers and drivers in other major car racing competitions. For example, there are innovative formula 1 driving simulation platforms in which the user has the possibility to "drive" in a track reproduced in 3D and projected on screens. The platform is able to move in such a way as to give the perception that the single-seater adapts to the precise point of the track.

Furthermore, thanks to the presence of stepper motors arranged on the rear and at least one motor arranged on the front of the single-seater, the user has the possibility of trying experiences such as roll, pitch and yaw simultaneously with the visual emotional reaction. More in detail, these platforms comprise a chassis represented by a base resting on a floating floor; a body housing the stepper translation motors, an audio amplification system for reproducing vibrations, an uninterruptible power supply unit, the driving system such as a steering wheel or the like, the motors for feedback of the driving system, a pedal assembly for accelerator and brake; an electrical, electronic and display part suitable for the management of the various components.

The mechanical part, housing the stepper motors for mechanical movement, provides for that these motors be covered with a protective casing.

In the aeronautical industry, the state of the art of simulation in the field to which the present invention relates is represented by a so-called "hexapod" system consisting of a platform to which six piston-like actuators are connected. The system is controlled by a specific software which allows converting the assigned coordinates in a virtual Cartesian axes system into position commands for the single actuators by a controller. The fields of application of this high-technology simulation system are numerous: for example, document WO2014076079 describes a robot having the characteristics of the aforementioned hexapod system to be used, by way of non-limiting example, for repairing nuclear reactors. More in detail, the above document describes a hexapod system for a robot comprising a first and a second support and six linear actuators having two ends.

Each end is connected to the respective supports by means of rotatable connection means.

As mentioned several times, this type of simulation systems can be used in various fields of application, in particular such systems are suitable for the simulation of automotive and air driving experiences not only in conventional situations but also in so-called extreme and dangerous situations.

In many cases, the need to have innovative simulators such as to allow the simulation of the driving experience to take place as closely as possible to reality, is not just an end in itself and for defining a high-tech equipment capable of faithfully reproducing the movements of a racing car or aircraft during a landing operation, but rather it stems from the important need to allow the users of such systems to conduct training exercises aimed at training pilots in the aforementioned air or car driving conditions without causing, thereto, the effects of motion sickness, an event which occurs in situations of abrupt and sudden change of direction or in situations in which the sensations expected by the human body do not coincide with the proposed visual situations or in situations of prolonged training in which the aforementioned situations are present.

The ability to faithfully reproduce the widest range of conditions that can be encountered by the driver/pilot when driving/piloting such means is thus of great importance and crucial towards the effectiveness of the simulator as a trainer.

One of the parameters that is of particular importance to date in evaluating the faithful reproducibility of the driving/piloting experiences offered by a simulator is the so-called "lateral G force". Such parameter is particularly relevant when driving a vehicle, when piloting a military fighter jet and in all cases where the human body is subject to sudden and intense changes of direction.

This is more specifically a magnitude indicating lateral centripetal acceleration force generated by the static friction of the tyres, proportional to the load factor, toward the centre of the curve. Sports cars can generally reach lateral G force values comprised between 1 to 1.5 G for short periods, while racing cars can reach above 5 lateral G force values.

A distinctive simulator that allows reproducing the driving experiences corresponding to the faithful perception of the forces that develop from the lateral accelerations that can be occur when driving in a formula 1 track, is described in patent application n° IT201600106809. The object of the present utility model patent application is to describe an optimised driving experience simulation device which represents a version that is more advanced than the one described in the aforementioned patent application and which, at macroscopic level, offers more degrees of freedom of movement for some of the components thereof. All this makes the driving experience simulated by the user thereof even more realistic.

SUMMARY OF THE INVENTION

The invention according to the present description is represented by a distinctive and optimised device for simulating driving experiences which, with respect to the previous version thereof subject of the Italian application n° IT201600106809 has structural characteristics such to confer some of the components thereof a greater number of degrees of freedom of movement, thus resulting in a simulation device offering the perception of driving experiences, typical but not limited to driving in formula 1 tracks, perceivable even more as realistic.

For the sole purpose of a greater descriptive exhaustiveness and for a better understanding of the implementations present in the invention according to the present utility model, a detailed description of the earlier version thereof, subject of the aforementioned Italian patent application, is outlined below. The implementations thereto are highlighted too.

Specifically, the optimised driving experience simulation device according to the present invention is, similarly to the prior version thereof, a simulation device capable of faithfully reproducing the mechanical stresses, as well as the emotional perceptions, to which a human body is subjected when driving a transport means. More in detail, said driving experience simulation device is capable of generating the lateral accelerations "G" that occur when negotiating a curve.

Even more in detail, the simulation device in question is capable of simulating said lateral forces in the widest range of negotiating curves, both in terms of duration and intensity.

Said device also allows inverting the forces involved in the simulation in real time.

More specifically, the simulation device in question, similarly to the earlier version thereof, allows the reproduction of the forces which are exerted by the lateral accelerations when a curve by virtue of a distinctive arrangement of the structural components thereof.

Even more specifically, said device comprises planes provided with independent rotary motion interrupted by a plane to which a translational motion can also be associated.

The movement planes work in a synchronised manner according to the numerical control systems.

The simulation device according to the present invention is such that the mechanical structure thereof and the intensity and amplitude of the translational and rotational horizontal movement of the components thereof allow to nullify the latency between the expected movement and the movement perceived by the user.

Furthermore, due to the distribution of specific functions assigned to the various planes, the device in question is capable of generating the set of forces associated with the lateral accelerations to be reproduced in a faster and more precise manner, fully meeting the extensive range of the user's emotional expectations.

More specifically, the simulation in question substantially comprises at least four superimposed and non-coaxial planes which have a specific spatial configuration, described in detail hereinafter, suitable to allow to obtain all the advantages offered by the present invention.

The first plane comprises a circular rotation plate which has the function of generating the forces associated with the lateral accelerations as a function of the position of the body of the user and works in the horizontal plane.

The second plane, arranged on said first plane, comprises a circular rotation plate whose centre is arranged on said first plane in a non-coaxial manner Preferably, it is arranged so that the centre thereof is three-quarters of the radius associated with said first plane starting from the centre of the first plate. The second plane, combined with the fourth plane, has the function of positioning the body of the user in a position lateral to the direction of rotation of the plane 1 and it also works in the horizontal plane.

The third plane comprises a linear positioning plate arranged centred on said second plane.

The third plane is designed to generate the forces associated with accelerations and brakings and it also works in the horizontal plane. Said third plane comprises a track-like structure for the sliding of an overlying slidable base.

The fourth plane, arranged on said third plane, comprises a rotation plate and a slidable base which slides linearly on said track-like structure which is comprised in said third plane.

The fourth plane has the function of generating the forces, associated with lateral accelerations, stemming from abrupt and sudden changes in direction and/or loss of grip on the front or rear wheels.

Said fourth plane also works in the horizontal plane.

It is also important to point out that the second plane and the fourth plane are necessary for correctly positioning, and within the required times, the body subject of lateral acceleration. The device further comprises: a fifth plane comprising a column-equipped lifting device, by way of non-limiting example in the form of actuators, controlled by a related simulation software which allows converting the assigned coordinates in a virtual Cartesian axes device into position controls for the single actuators. The fifth plane further comprises a cockpit suitable to accommodate the user and, preferably but not limitedly, it may comprise—in some of the preferred embodiments thereof—further cockpits for controlling the driving by third parties.

With respect to the driving experience simulation device described above, the optimised device according to the present invention is characterised in that said third plane is constrained to the second plane on the edge of the latter by means of a pin which allows the oscillation thereof in the plane.

Said pin can be found at one end of said third plane, as will be made clearer in the description hereinafter and upon observing the attached figures.

For the sake of greater understanding and clarity of the present invention, a detailed description of the operation of the device in question in one of preferred embodiments thereof will be provided below.

Figure 1:
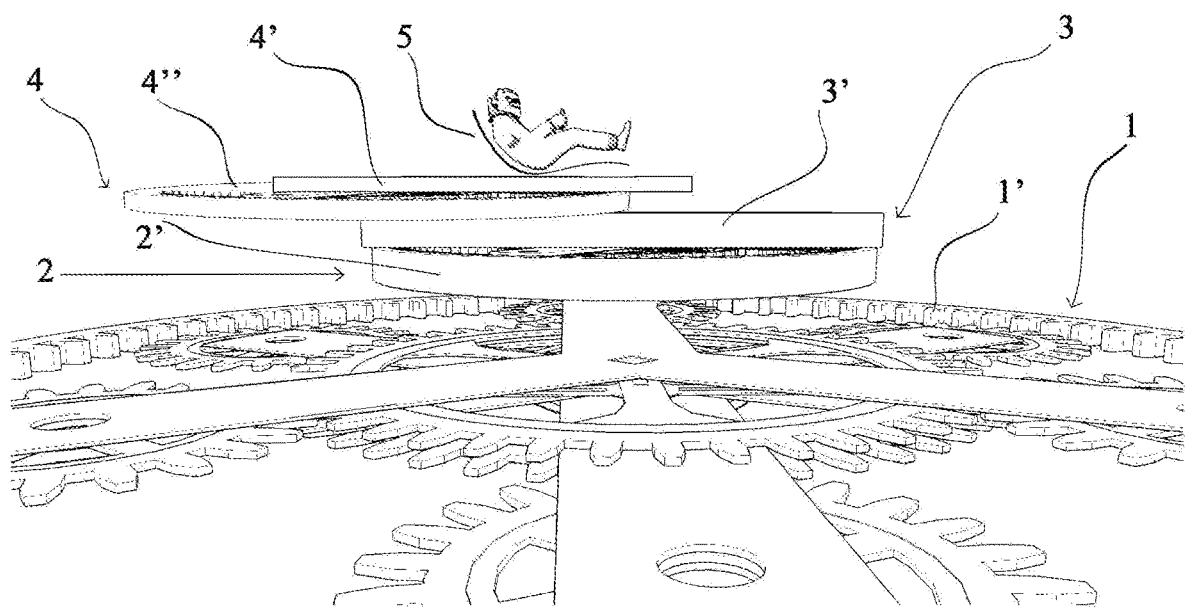
FIG. 1 shows a lateral view of the driving experience simulation device according to the present invention in a distinctive embodiment thereof.

More in detail, the figure in question shows that said device comprises five planes and in particular a first plane 1, a second plane 2, a third plane 3, a fourth plane 4 and a fifth plane 5. In particular, said first plane 1, second plane 2 and fourth plane 4 comprise rotation plates superimposed in an off-centred manner which are configured in space so that the rotary movement of each rotation plate with respect to the axis thereof, generates the forces associated with the lateral accelerations that the driver should perceive, so that the device is able to simulate the driving experience when negotiating curves like the ones characterising formula 1 tracks.

The figure in question shows four profiled planes, similar to epicyclic gears in this particular embodiment shown.

More specifically, the first rotation plate 1', the second rotation plate 2', and the fourth rotation plate 4''', respectively comprised in the first plane 1, the second plane 2 and the fourth plane 4, are shown as gears that can be driven by the respective pinions.

The device also shows the particular spatial configuration of the superimposed planes in off-centred manners.

More in detail, the centre of the second rotation plate 2' can be detected at a ¾ height of the radius associated with said first rotation plate 1' starting from the centre of the first rotation plate 1', and the centre of rotation of the fourth rotation plate 4'' in a curve configuration can be detected generically at a point projecting along the circumference of the second rotation plate 2'. The figure also shows that: integrally joined above the second rotation plate 2', the structure 3' of the third plane 3 can be found, suitable to allow the sliding of the slidable base 4' to which the fourth rotation plate 4'' is integrally joined at the lower part.

Figure 2:
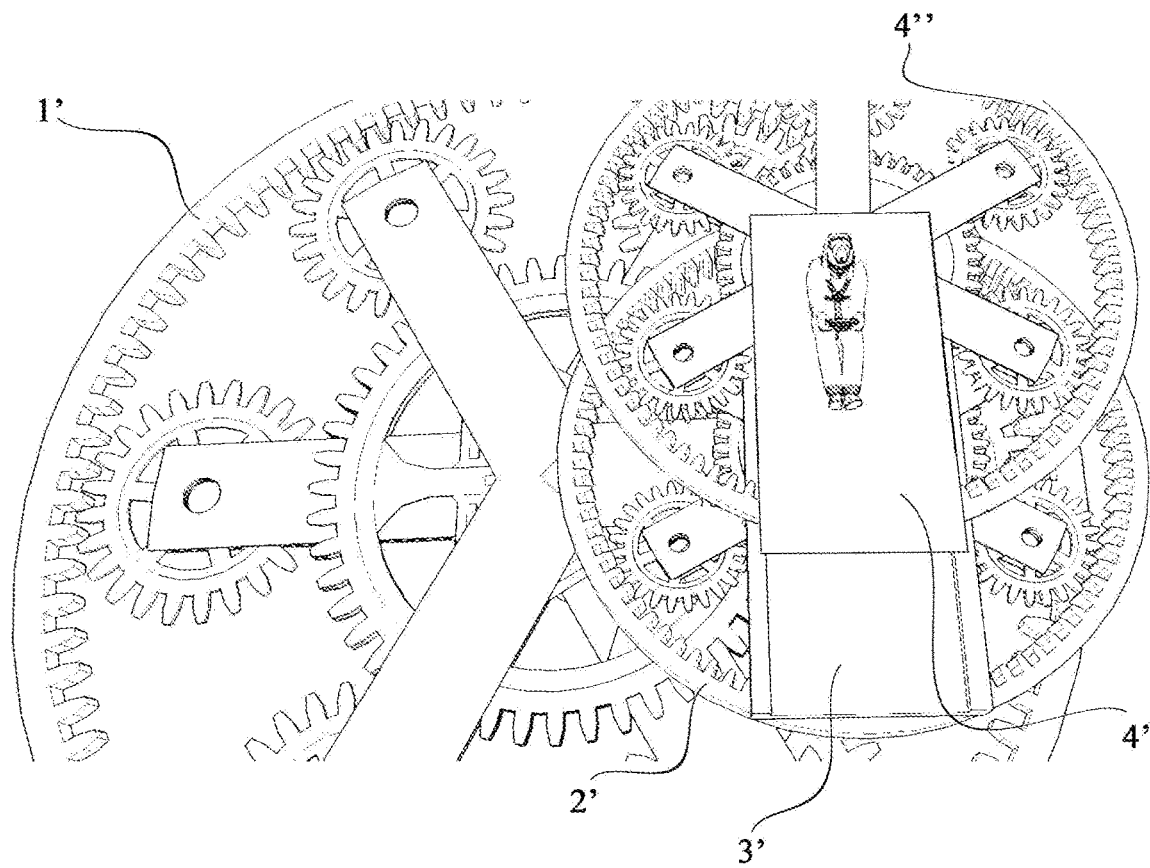

FIG. 2 is a top view of the driving experience simulation device as described in FIG. 1.

Figure 3:
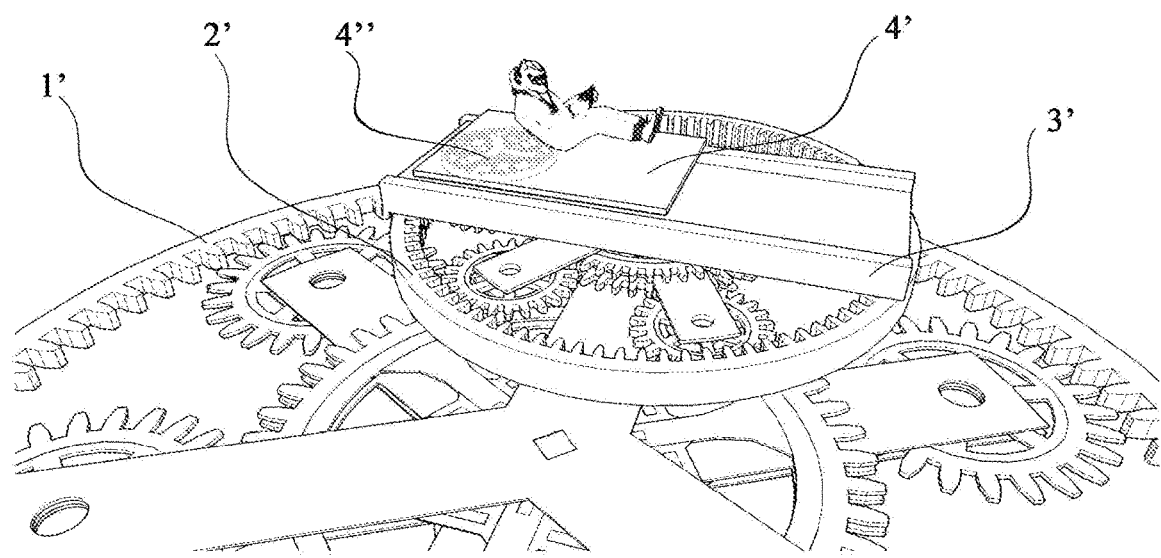

FIG. 3 is a perspective view of the driving experience simulation device as described in FIG. 1. The figure also shows the case in which the ratio between the diameter of the fourth rotation plate 4'' and that of the second rotation plate 2' is 1:4, contrary to the case illustrated in the aforementioned figures in which this ratio is 1:1.

Figure 4:
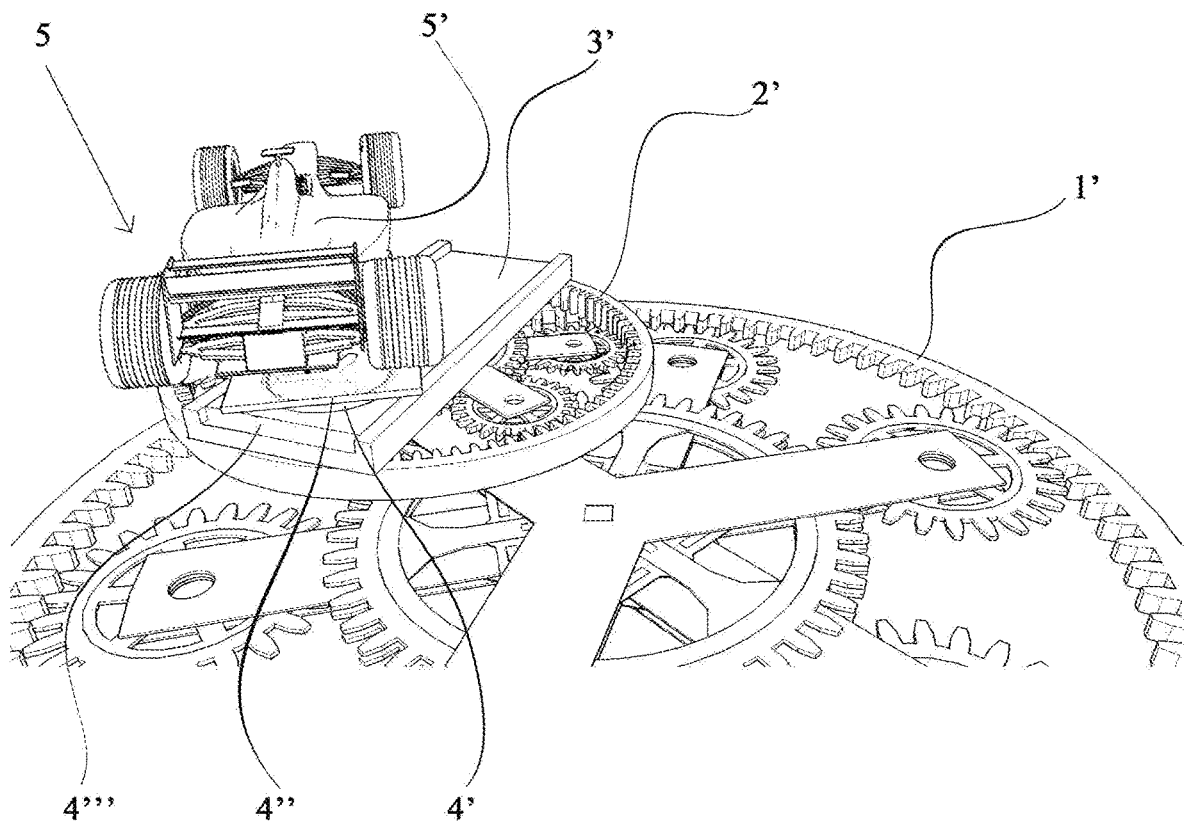

FIG. 4 shows a perspective view of the simulation device in question in which the cockpit 5' can be seen as a single-seater. The figure also shows that said cockpit 5' is arranged above the fourth plane 4 comprising the slidable base 4' to which the fourth rotation plate 4''' supported by the support 4''' is integrally joined at the lower part, longitudinally sliding in the structure 3' of the third plane. This arrangement allows associating a rototranslational motion with the slidable base 4'.

Figure 5:
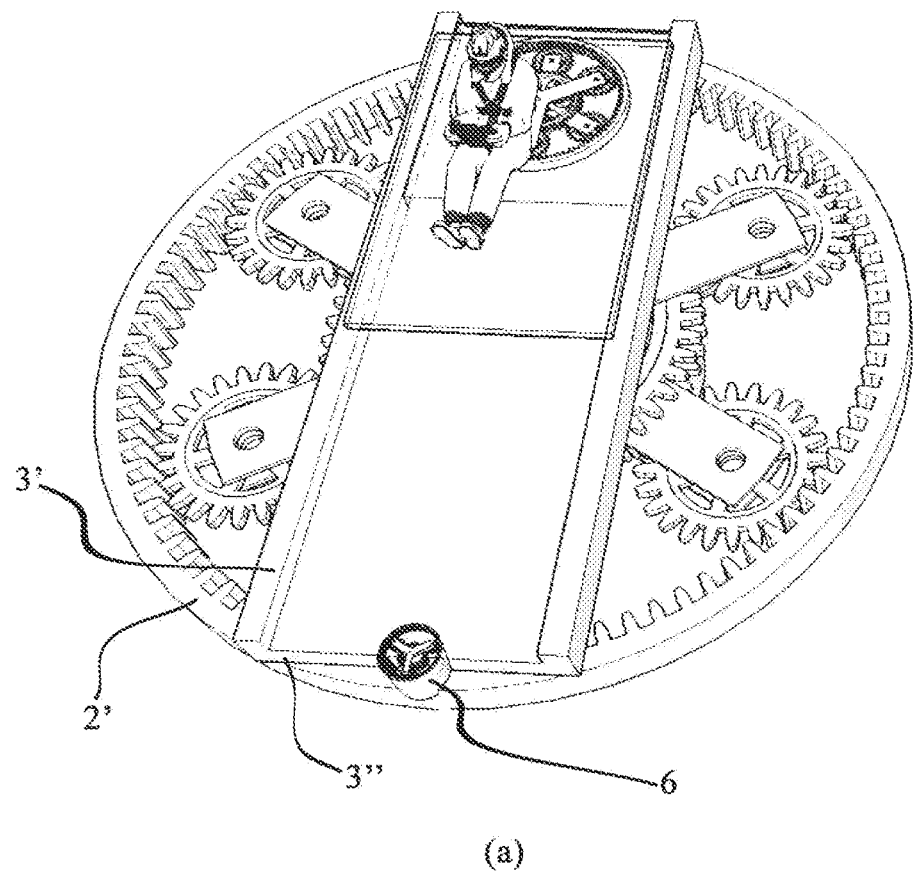
Figure 5:
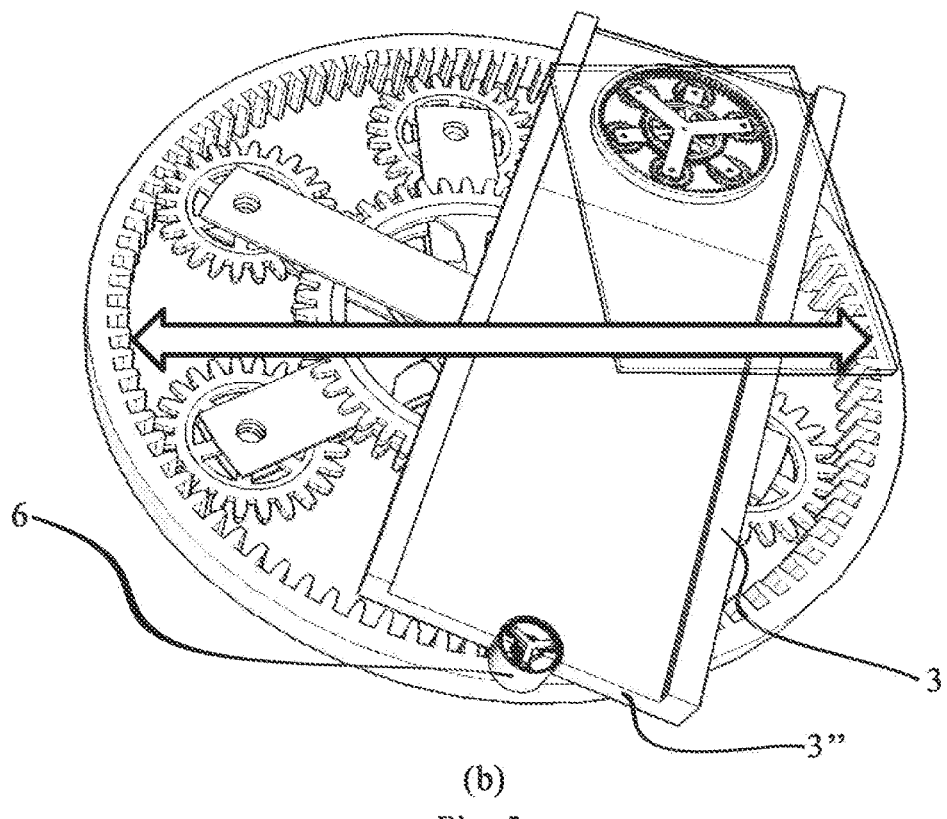

FIG. 5 shows a representation of the device according to the present invention in which it is shown how the third plane 3 is constrained to the underlying plane 2 by means of a special pin 6 that can be found at one end of the third plane 3 and specifically at the end of a smaller side of the track-like structure 3'. Even more specifically, said pin 6 constrains the front smaller side 3'' of the rectangular profile of the track-like structure 3' with the edge of the underlying rotation plate 2' of the second plane 2. FIGS. 5(*a*) and 5(*b*) show the movement in the plane of the third plane 3 and specifically of the structure 3' by means of said pin 6.

DESCRIPTION OF THE PREFERRED EMBODIMENTS

The invention according to the present utility model will be described herein with reference to the attached drawings, provided by way of non-limiting example, in one of the preferred embodiments thereof. In order to provide a better understanding of the device in question, not limited to the implementations thereof, a detailed description of the device in its entirety is provided below, also outlining the characteristics similar to those described regarding the previous version thereof, subject of the aforementioned industrial invention patent application. In general, the driving experience simulation device according to the present invention is a structure substantially comprising at least five superimposed planes, some of which are superimposed in an off-centred manner and in particular, starting from the bottom upwards: a first plane 1 in turn comprising a first rotation plate 1'; a second plane 2 in turn comprising a second rotation plate 2': a third plane 3 comprising a preferably rectangular-shaped structure 3' suitable to act as a track-like base for supporting an overlying plane 4; a fourth plane 4 in turn comprising a sliding base 4' suitable to slide longitudinally along said track-like structure 3', and a fourth rotation plate 4'' integrally joined beneath said slidable base 4' and supported by a support 4''' slidable longitudinally in said structure 3'.

Even more in detail, said planes comprised in the simulation device in question and in particular said rotation plates present therein, are superimposed on each other in such a way that their longitudinal axes do not coincide, thus resulting in non-coaxial structures.

Their dimensions, and more specifically the dimensional ratios thereof, and the spatial configurations thereof are crucial towards obtaining the advantages which said device intends to offer to the user: firstly, the user perceives the forces associated with the lateral accelerations of a vehicle when negotiating curves such as the curves, by way of non-limiting example, of the formula 1 tracks, the nullification of the effects stemming from motion sickness and the precision of the movements.

The device further comprises a fifth plane 5 comprising at least one cockpit 5', typically similar to single-seater, overlying said fourth plane 4.

The operation of the simulation device according to the present invention provides for that the user/driver, sitting in said cockpit, when entering into the curve, has the back thereof positioned facing towards circumference of the second rotation plate 2' of the second plane 2 and simultaneously with the back facing towards the centre of rotation of the first rotation plate 1' of said first plane 1.

In detail, the body of the user/driver is comprised between the circumference of the rotation plate 2' and the centre of rotation thereof.

The length of the radius of the fourth rotation plate 4'' is determined by the length occupied by the body between the centre of rotation of the fourth rotation plate 4'' and the circumference thereof.

If the intention is to negotiate a right-hand curve, the steering wheel (or an equivalent steering system present in said cockpit 5') will be moved clockwise and said fourth rotation plate 4'' will rotate clockwise too.

The underlying rotation plate 2' included in the second plane 2 will also rotate clockwise until the cockpit 5' of the user/driver is positioned, acting synergistically with the rotation of the fourth rotation plate 4'', in a position lateral and tangent to the circumference of the first rotation plate 1'. In this manner, the user will be with the right side thereof facing toward the centre of said first rotation plate 1' of the first plane 1, and with the left side thereof facing toward the perimeter of said first rotation plate 1'. The latter, and simultaneously with the rotation of the overlying rotation plates, will begin to rotate clockwise, to the right, subjecting all the bodies arranged above the said fourth rotation plate 4'' to the effect of a centrifugal force. Being subjected to this effect too, the user will be able to perceive the forces at play when negotiating the curve as real.

All this allows simulating the experience of negotiating a curve as closely as possible to reality. The third plane 3 and the fifth plane 5 are irrelevant for the generation of the lateral G forces but they mainly serve the purpose of allowing the activation of the front, rear and vertical translational motions of the cockpit, thus of the user too indirectly, in order to simulate even only partially, forces resulting from accelerations, braking, collisions, inclination changes or position changes. Thanks to the presence of a pin 6, by means of which the track-like structure 3' is constrained to the underlying second rotation plate 2', further allows the oscillating movement of the third plane 3 with respect to said pin 6.

As regards the dimensional aspect, in general the whole of the device is typically, but not necessarily, influenced by the size of the cockpit 5' comprised in said fifth plane 5; the dimensions of the underlying planes are established based on such dimension, in a cascade fashion.

In general, the first rotation plate 1' has a diameter greater than the second rotation plate 2', whose centre is at a point that can be projected on the radius of the underlying first rotation plate 1', and the second rotation plate 2' has a diameter equal to or greater than the fourth rotation plate 4", whose centre is at a point that can be projected on the radius of the underlying second rotation plate 2' or along the circumference thereof. In this just like in other embodiments, the simulation device according to the present invention provides for that the diameters of the first plane 1 and of the second plane 2, and in particular of the rotation plates comprised therein, that is, that of the first rotation plate 1' and that of the second rotation plate 2', be dependent on the length chosen to be allocated to the third plane 3 which, in turn, depends on the length of the radius of the fourth rotation plate 4" of the fourth plane 4. Preferably, the ratio between the diameter of the first rotation plate 1' and the second rotation plate 2' is typically, but not limitedly, 2:1. The diameter of the second rotation plate 2' is typically, but not limitedly, equal to the length of the third plane 3 and in particular of the track-like structure 3' thereof which is typically rectangular-shaped and is dimensioned to allow the sliding of the overlying slidable base 4'. Hence, said diameter of the second rotation plate 2' is equal to the length of the greater side of the rectangular profile of said track-like structure 3'. The ratio between the diameter of the fourth rotation plate 4" and the diameter of the second rotation plate 2' is typically, but not limitedly, 1:1.

It should be pointed out that said planes of the optimised simulation device in question are variously structured in the various embodiments of said device.

With reference to the attached figures, said planes and in particular the first plane 1, the second plane 2 and the fourth plane 4 are structured, in the distinctive embodiment shown, similarly to gears.

Therefore, said planes comprise all the known mechanical components and linkages associated with this type of mechanism for transmitting mechanical moments.

More specifically, this embodiment provides for that the first plane 1 comprises a rotation plate 1' structured similar to a common gearwheel whose motion is imparted by common pinions, circumscribed by said gearwheel, similarly what occurs in the known epicyclic gears. Similarly, the other rotation plates 2' and 4" are also structured as epicyclic gear systems and thus the planes to which they belong comprise all the known components suitable for the kinematic motion thereof.

Thus, the description of said known components is omitted from the present document, assuming that the average man skilled in the art implies their presence, or that of equivalent systems, that the essence of the invention lies in the distinctive spatial configuration of the at least four planes comprised in the device in question and in the principle of operation of the latter which, due to the rotation of the rotation plates comprised therein and suitably configured in the space, allows providing the user with a perception of a faithful reproduction of the forces associated with the lateral accelerations that develop when negotiating curves like the ones characterising formula 1 tracks.

In any case, it should be pointed out that the device in question for the transmission of the motions can be driven by electric motors and gearmotors whose number may vary depending on the overall dimensions of the device and the performance to be achieved.

Further embodiments according to the present invention provide for that the simulation device in question uses magnetic suspension and propulsion systems typical of magnetic levitation "Maglev" systems.

In this case, the planes comprising said rotation plates will keep the operating principle of the simulation device according to the present invention similar, aiming—as repeated several times—at reproducing the forces developing from lateral accelerations when negotiating curves like the ones, by way of non-limiting example, characterising formula 1 circuits.

In the latter just like in other embodiments, the at least four planes of the device and in particular the first plane 1 and the second plane 2, the third plane 3 and the fourth plane 4 can be spaced by interfaced permanent magnets with opposite sign in order to reduce the friction between the rotating parts.

Besides the distinctive spatial configuration of the planes of the device, a further essential characteristic according to the present invention lies in the fact that the rotation plates comprised therein, i.e. the first rotation plate 1', the second rotation plate 2' and the fourth rotation plate 4" can rotate about their own axis both clockwise and anticlockwise and continuously without end of stroke by 360°.

Irrespectively of the structural variants that can be observed in the various embodiments, the unitarity that can be observed in the device according to the present invention lies in the operating principle thereof and in the method that uses it.

Said method, which uses the device in question, allows the user of the simulation device to perceive the forces relative to the lateral accelerations of a vehicle when negotiating a curve. Thus, said method consists in exploiting at least five planes as described above so as to obtain the desired effect.

More in detail, said method provides for that out of the at least five planes, and more specifically the rotation plates present therein, the fourth rotation plate 4" underlying the fifth plane 5, comprising the lifting device and the cockpit 5' of the user, allows the user to control the steering and the direction, clockwise or counter-clockwise, when "entering" a curve by acting on a steering system such as a handlebar, a joystick, a rudder, a steering wheel, a cloche or the like; said second rotation plate 2', underlying and supporting the structure 3', suitable to allow the sliding of the sliding base 4' to which said fourth rotation plate 4' is integrally joined at the lower part (and on which the fifth plane 5 is arranged), allows, by rotating about the own axis thereof, to subject everything arranged above said second rotation plate 2', including the user, to a centrifugal action.

Underlying said rotation plates, having a larger diameter than the latter, and supporting the overlying planes, by rotating about the axis own thereof the first rotation plate 1' allows subjecting the entirety to the main centrifugal force, thus enhancing and completing the centrifugal action of the rotation of the second and fourth rotation plates 2' and 4" and acting as a maxi centrifuge in all respects.

The entirety allowing the user to perceive a reproduction as closest as possible to the reality of the forces associated with the lateral accelerations typical of the curves of formula 1 tracks. As mentioned in the course of the present description, the device can be automated and managed using a software suitable for the transmission of specific electrical signals that can be translated into distinctive driving experiences.

The transmission of said electrical signals can be carried out in wireless mode or by means of common wired methods.

The electric current for the motor drive can be transmitted either through wired means or by means of magnetic induction.

Just like in the prior art driving experience simulation systems like the ones regarding the present invention, the device comprises, typically in the cockpit provided with access for the user, at least one from among the vehicle steering systems such as a steering wheel, a handlebar, a rudder, a cloche, a joystick and the like, from which the signal is transferred to the rotation plates as well as the direction to be adopted and the relative acceleration.

In all embodiments thereof, the components of the driving experience simulation device according to the present invention can be made of polymeric and/or metallic and/or composite materials.

It should also be pointed out that in all the embodiments thereof, the simulation device in question may comprise in the fifth plane 5, as already mentioned, in addition to the cockpit 5', a lifting system for simulating driving experiences associated with inclination changes.

Said lifting system is, by way of non-limiting example, represented by a system comprising actuator-like columns.

The software associated with the simulation device in question allows converting the coordinates in a virtual Cartesian axes system into position controls for the single actuator-like columns.

Said columns move under the control of said simulation software which manages the spatial inclinations that said lifting system comprised in the fifth plane 5 is required to reproduce.

As mentioned above, said lifting system is comprised in said plane 5 and it is irrelevant for the generation of the forces associated with lateral accelerations, which on the contrary is, specifically, the main purpose of the simulation device in question.

The invention claimed is:

1. A driving experience simulation device comprising at least five superimposed planes, said planes being in sequence from a bottom upwards: a first plane comprising a first rotation plate; a second plane comprising a second rotation plate; a third plane comprising a track-like structure for sliding of an overlying slidable base; a fourth plane comprising said slidable base, a third rotation plate integrally joined beneath said slidable base, a support bearing said third rotation plate and slidable in said structure; and at least one fifth plane comprising at least one cockpit, configured to enable a user to access said driving experience simulation device, said simulation device having said rotation plates superimposed in a de-centered fashion thus being non-coaxial structures, said first rotation plate having a greater diameter than said second rotation plate, the second rotation plate having a diameter equal to or greater than said third rotation plate, said second rotation plate having the center thereof in a point that can be projected on the radius of the underlying first rotation plate, said third rotation plate having a center thereof in a point that can be projected on the radius of the underlying rotation plate or along the circumference thereof, said track-like structure being integrally joined—at an upper part—to said second rotation plate and being dimensioned to enable the sliding of the overlying slidable base, each of said first rotation plate, second rotation plate, and third rotation plate being rotatable by 360° around the rotational axis thereof both clockwise and anticlockwise, said driving experience simulation device being configured to simulate forces related to lateral acceleration forces that occur when negotiating curves, wherein said track-like structure of the third plane is constrained to the underlying second rotation plate by means of a pin, the pin constraining a front smaller side of the rectangular side of the track-like structure with the edge of the underlying rotation plate of the second plane.

2. The driving experience simulation device according to claim 1, wherein the ratio between the diameter of the first rotation plate and the second rotation plate is 2:1, the diameter of the second rotation plate is equal to the length of the track-like structure, the track-like structure being rectangular-shaped, and the ratio between the diameter of the third rotation plate and the second rotation plate is 1:1.

3. The driving experience simulation device according to claim 2, wherein the center of the second rotation plate can be projected to ¾ of the radius associated to said first rotation plate starting from the center of the first rotation plate, and the center of the third rotation plate can be projected along the circumference of the underlying said second rotation plate.

4. The driving experience simulation device according to claim 2, wherein each said rotation plate is structured like a planetary gear, the first rotation plate, the second rotation plate, and the third rotation plate being structured like movable crown gears with respective pinions.

5. The driving experience simulation device according to claim 2, further comprising magnetic suspension and propulsion systems.

6. The driving experience simulation device according to claim 2, further comprising—inside the cockpit for the access of the user—at least one vehicle steering selected from among a steering wheel, a handlebar, a rudder and a joystick.

7. The driving experience simulation device according to claim 1, wherein the center of the second rotation plate can be projected to ¾ of the radius associated to said first rotation plate starting from the center of the first rotation plate, and the center of the third rotation plate can be projected along the circumference of the underlying said second rotation plate.

8. The driving experience simulation device according to claim 7, wherein each said rotation plate is structured like a planetary gear, the first rotation plate, the second rotation plate, and the third rotation plate being structured like movable crown gears with respective pinions.

9. The driving experience simulation device according to claim 7, further comprising magnetic suspension and propulsion systems.

10. The driving experience simulation device according to claim 7, further comprising—inside the cockpit for the access of the user—at least one vehicle steering system selected from among a steering wheel, a handlebar, a rudder and a joystick.

11. The driving experience simulation device according to claim 1, wherein each said rotation plate is structured like a planetary gear, the first rotation plate, the second rotation plate, and the third rotation plate being structured like movable crown gears with respective pinions.

12. The driving experience simulation device according to claim 11, further comprising magnetic suspension and propulsion systems.

13. The driving experience simulation device according to claim 11, further comprising—inside the cockpit for the access of the user—at least one vehicle steering system selected from among a steering wheel, a handlebar, a rudder and a joystick.

14. The driving experience simulation device according to claim 1, further comprising magnetic suspension and propulsion systems.

15. The driving experience simulation device according to claim 14, further comprising—inside the cockpit for the access of the user—at least one vehicle steering system selected from among a steering wheel, a handlebar, a rudder and a joystick.

16. The driving experience simulation device according to claim 1, further comprising—inside the cockpit for the access of the user—at least one vehicle steering system selected from among a steering wheel, a handlebar, a rudder and a joystick.

17. The driving experience simulation device according to claim 1, wherein the device comprises at least one of polymeric, metallic and composite material.

18. The driving experience simulation device according to claim 1, wherein the device is configured to be controlled using software suitable to transmit electrical signals that can be translated into distinctive driving experiences, said transmission of said electrical signals occurring in wireless or wired mode.

19. The driving experience simulation device according to claim 18, wherein the device comprises transmission means, electric motors and gear motors.

20. The driving experience simulation device according to claim 1, further comprising a lifting system for simulating driving associated to change of inclination said lifting system comprising actuator-like columns and being comprised in the fifth plane.

* * * * *